US 10,316,855 B2

(12) United States Patent
Mastro

(10) Patent No.: US 10,316,855 B2
(45) Date of Patent: Jun. 11, 2019

(54) SHAFT ANTI-ROTATION DEVICE

(71) Applicant: United Technologies Corporation, Farmington, CT (US)

(72) Inventor: Jacob Peter Mastro, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 715 days.

(21) Appl. No.: 15/180,464

(22) Filed: Jun. 13, 2016

(65) Prior Publication Data
US 2017/0356452 A1 Dec. 14, 2017

(51) Int. Cl.
| F04D 29/06 | (2006.01) |
| F04D 29/054 | (2006.01) |
| F02K 3/06 | (2006.01) |
| F02C 7/36 | (2006.01) |
| F01D 25/18 | (2006.01) |
| F04D 19/00 | (2006.01) |
| F04D 29/32 | (2006.01) |

(Continued)

(52) U.S. Cl.
CPC .......... *F04D 29/054* (2013.01); *F01D 21/14* (2013.01); *F01D 25/18* (2013.01); *F02C 7/06* (2013.01); *F02C 7/36* (2013.01); *F02K 3/06* (2013.01); *F04D 19/002* (2013.01); *F04D 29/329* (2013.01); *F16D 41/07* (2013.01); *F05D 2220/32* (2013.01); *F05D 2260/4023* (2013.01); *F05D 2260/40311* (2013.01); *F05D 2270/116* (2013.01)

(58) Field of Classification Search
CPC ...... F04D 29/054; F04D 29/329; F04D 29/06; F04D 19/002; F02K 3/06; F01D 21/14; F01D 15/12; F01D 25/18; F02C 7/06; F02C 7/36; F02C 7/32; F02C 7/275; F16D 41/07; F16D 41/069; F16D 41/06; F05D 2220/32; F05D 2220/50; F05D 2260/4023; F05D 2260/40311; F05D 2260/402; F05D 2260/40; F05D 2260/403; F05D 2270/116
See application file for complete search history.

(56) References Cited

U.S. PATENT DOCUMENTS

| 3,191,732 A | 6/1965 | McDowall |
| 3,207,278 A | 9/1965 | Titt |

(Continued)

FOREIGN PATENT DOCUMENTS

WO WO2015060912 A2 4/2015

OTHER PUBLICATIONS

Extended European Search Report for EP Application No. 17175671.1, dated Oct. 25, 2017, 6 pages.

*Primary Examiner* — Jason D Shanske
*Assistant Examiner* — Joshua R Beebe
(74) *Attorney, Agent, or Firm* — Kinney & Lange, P.A.

(57) ABSTRACT

A gas turbine engine includes a fan and a first drive shaft connected to the fan. A fan drive gear box connects the first drive shaft to a second drive shaft and is configured to allow the first drive shaft to rotate at a different speed than the second drive shaft. The gas turbine engine also includes a sprag clutch disposed circumferentially around the first shaft and connected to the first drive shaft. The sprag clutch is configured to allow rotation of the first drive shaft and the fan in a first direction while prohibiting rotation of the fan and the first drive shaft in a second direction.

19 Claims, 4 Drawing Sheets

(51) Int. Cl.
*F02C 7/06* (2006.01)
*F01D 21/14* (2006.01)
*F16D 41/07* (2006.01)

(56) References Cited

U.S. PATENT DOCUMENTS

| | | | | |
|---|---|---|---|---|
| 3,335,832 | A * | 8/1967 | Candela | F16D 41/069 |
| | | | | 192/223.1 |
| 5,349,814 | A * | 9/1994 | Ciokajlo | F02C 7/262 |
| | | | | 60/226.1 |
| 6,536,571 | B1 * | 3/2003 | Myrick | B60T 1/005 |
| | | | | 188/82.8 |
| 8,534,074 | B2 * | 9/2013 | Copeland | F02C 7/277 |
| | | | | 60/226.1 |
| 2007/0199331 | A1 * | 8/2007 | Maguire | F02C 3/107 |
| | | | | 60/796 |
| 2008/0078640 | A1 * | 4/2008 | Smetana | F16D 41/069 |
| | | | | 192/41 A |
| 2008/0149447 | A1 * | 6/2008 | Davis | F16D 41/069 |
| | | | | 192/45.1 |
| 2009/0045024 | A1 * | 2/2009 | Ruth | F16D 41/069 |
| | | | | 192/43.1 |
| 2009/0320491 | A1 | 12/2009 | Copeland | |
| 2009/0322088 | A1 * | 12/2009 | Dooley | F02C 7/275 |
| | | | | 290/46 |
| 2012/0216549 | A1 * | 8/2012 | Burns | B64D 35/00 |
| | | | | 60/786 |
| 2013/0195603 | A1 | 8/2013 | Sheridan et al. | |
| 2014/0064915 | A1 | 3/2014 | Masson et al. | |
| 2015/0292415 | A1 | 10/2015 | Anglin et al. | |

\* cited by examiner

SHAFT ANTI-ROTATION DEVICE

BACKGROUND

The present disclosure relates to a gas turbine engine and, more particularly, to a mechanical clutch that limits reverse rotation of a fan and a fan drive shaft of the gas turbine engine.

Gas turbine engines typically include a fan, a turbine section, a compressor section, and a combustor section. Gas turbine engines may employ a geared architecture connecting the fan and the turbine section and a lubrication system for providing lubricating fluid to the geared architecture during engine operation. The geared architecture includes bearings that require lubrication during the rotation of the fan to reduce wear on the bearings and prevent the bearings from seizing.

One challenge with gas turbine engines is called "windmilling." Windmilling occurs when the engine is shut down, but air is driven across the fan rotor. For example, windmilling can occur in a gas turbine engine mounted to an aircraft if the gas turbine engine shuts down during flight. In other examples, wind moving though a gas turbine engine parked on the ground causes windmilling. Windmilling is a challenge because windmilling can cause rotation of components in the geared architecture after the lubrication system has shut down. Rotation of the components in the geared architecture without a flow of lubricating oil can cause the bearings in the geared architecture to seize. Prior art gas turbine engines have addressed the challenge of windmilling by incorporating complex systems that lubricate the bearings when windmilling.

SUMMARY

In one aspect of the disclosure, a gas turbine engine includes a fan and a first drive shaft connected to the fan. A fan drive gear box connects the first drive shaft to a second drive shaft and is configured to allow the first drive shaft to rotate at a different speed than the second drive shaft. The gas turbine engine also includes a sprag clutch disposed circumferentially around the first shaft and connected to the first drive shaft. The sprag clutch is configured to allow rotation of the first drive shaft and the fan in a first direction while prohibiting rotation of the fan and the first drive shaft in a second direction.

In another aspect of the disclosure, a gas turbine engine includes a fan and a first drive shaft connected to the fan. A fan drive gear box connects the first drive shaft to a second drive shaft and is configured to allow the first drive shaft to rotate at a different speed than the second drive shaft. A lubrication pump is mechanically connected to the first drive shaft and configured to pump lubricating fluid to the fan drive gear box when the first drive shaft is rotated in a first direction after shutdown of the gas turbine engine. A sprag clutch is connected to at least one of the first drive shaft and the second drive shaft. The sprag clutch is configured to allow rotation of the first drive shaft and the second drive shaft in the first direction while prohibiting rotation of the first drive shaft and the second drive shaft in a second direction.

Persons of ordinary skill in the art will recognize that other aspects and embodiments of the present invention are possible in view of the entirety of the present disclosure, including the accompanying figures.

Figure 1:
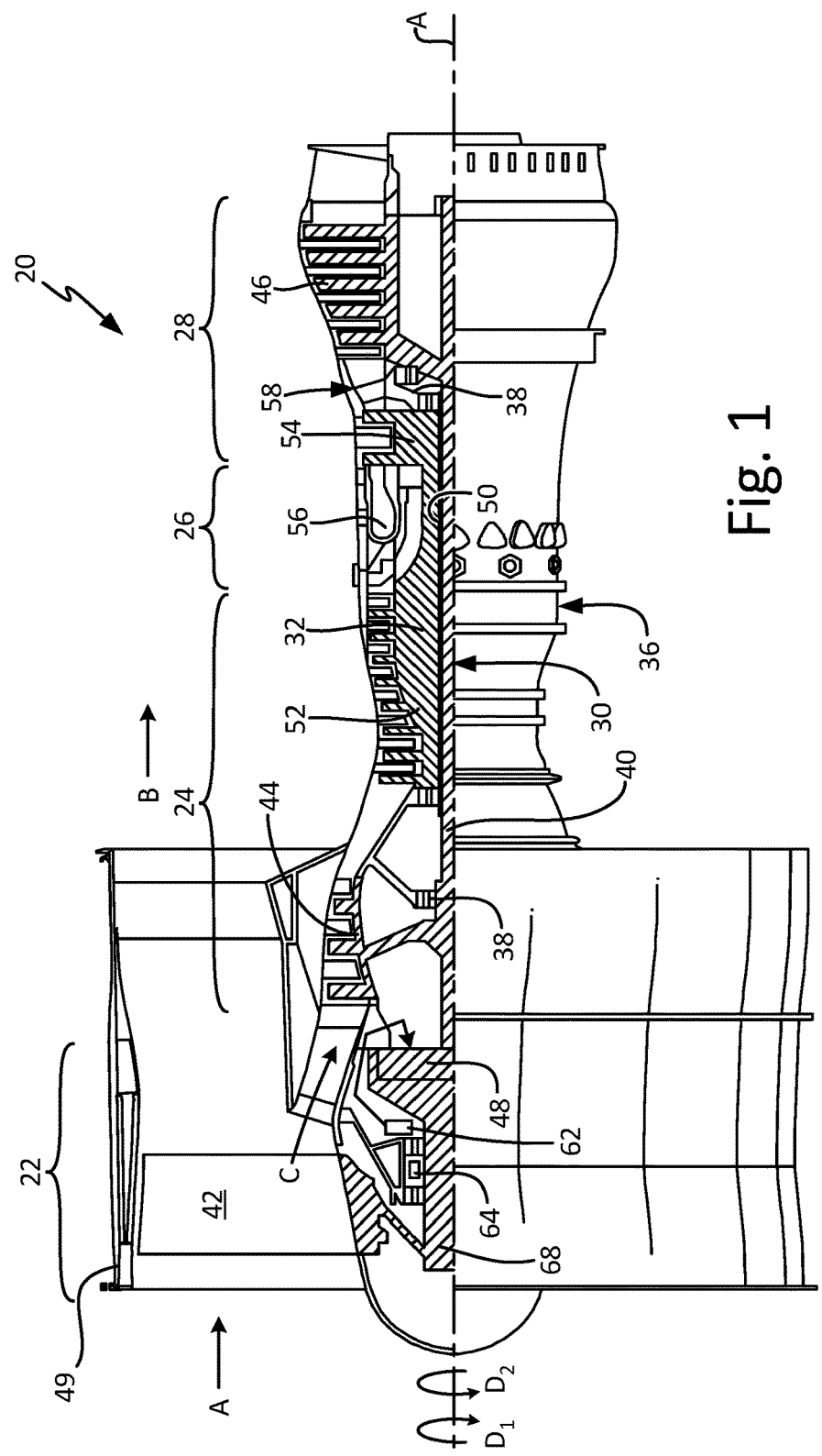
FIG. 1 is a partial cross-sectional view of an embodiment of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a gas turbine engine that includes a fan connected to a geared architecture and an auxiliary lubrication system that pumps lubricating fluid to bearings of the geared architecture when the fan windmills after engine shutdown. The auxiliary lubrication system is driven by the fan when the fan rotates in a first direction. The auxiliary lubrication system does not pump lubrication fluids to the bearings when the fan rotates in a direction opposite to the first direction. To prevent the fan from rotating in the second direction, the gas turbine engine includes a sprag clutch that allows the fan to only rotate in the first direction. The sprag clutch and auxiliary lubrication system are discussed below with reference to the figures.

FIG. 1 schematically illustrates a gas turbine engine 20. Gas turbine engine 20 is a two-spool turbofan gas turbine engine that generally includes fan section 22, compressor section 24, combustion section 26, and turbine section 28. Other examples may include an augmentor section (not shown) among other systems or features. Fan section 22 drives air along bypass flowpath B while compressor section 24 drives air along a core flowpath C. Compressed air from compressor section 24 is directed into combustion section 26 where the compressed air is mixed with fuel and ignited. The products of combustion exit combustion section 26 and expand through turbine section 28.

Although the disclosed non-limiting embodiment depicts a two-spool turbofan gas turbine engine, it should be understood that the concepts described herein are not limited to use with two-spool turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Gas turbine engine 20 generally includes low-speed spool 30 and high-speed spool 32 mounted for rotation about a center axis A relative to engine static structure 36. Low-speed spool 30 and high-speed spool 32 are rotatably supported by several bearing systems 38. Low-speed spool 30 interconnects fan 42, low-pressure compressor 44, and low-pressure turbine 46. Low-speed spool 30 generally includes inner shaft 40, geared architecture 48, and fan drive shaft 68. Fan 42 is connected to fan drive shaft 68. Inner shaft 40 is connected to fan drive shaft 68 through geared architecture 48 to drive fan 42 at a lower speed than the rest of low-speed spool 30. Fan 42 is considered a ducted fan as fan 42 is disposed within duct 49.

High-speed spool 32 includes outer shaft 50 that interconnects high-pressure compressor 52 and high-pressure turbine 54. Combustion section 26 includes a circumferentially distributed array of combustors 56 generally arranged axially between high-pressure compressor 52 and high-pressure turbine 54. Mid-turbine frame 58 of engine static structure 36 is generally arranged axially between high-pressure turbine 54 and low-pressure turbine 46. Mid-turbine frame 58 supports bearing systems 38 in the turbine section 28. Inner shaft 40 and outer shaft 50 are concentric and rotate via bearing systems 38 about engine center axis A, which is collinear with the longitudinal axes of inner shaft 40 and outer shaft 50.

In gas turbine engine 20, the core airflow C is compressed by low-pressure compressor 44 then high-pressure compressor 52, mixed and burned with fuel in combustors 56, then expanded over the high-pressure turbine 54 and low-pressure turbine 46. High-pressure turbine 54 and low-pressure turbine 46 rotatably drive high-speed spool 32 and low-speed spool 30 respectively in response to the expansion.

Geared architecture 48 of gas turbine engine 20 is a fan drive gear box that includes an epicyclic gear train, such as a planetary gear system or other gear system. The example epicyclic gear train has a gear reduction ratio of greater than about 2.3 (2.3:1).

During non-engine operating conditions such as when an aircraft is on the ground, or if the engine is off during flight, air flow through fan 42 can cause rotation of fan 42 around center axis A in a first direction D1. Rotation of fan 42 during non-engine operating conditions is commonly referred to as "windmilling." In FIG. 1, Air A represents wind that can cause windmilling of fan 42. During windmilling, air A flows across fan 42 along bypass flowpath B. Windmilling of fan 42 can cause back driving of geared architecture 48. In some instances, rotation of fan 42 can be of a speed which may result in significant rotation of geared architecture 48. Lubricant flow to geared architecture 48 is needed in all instances where gears within the geared architecture 48 are rotating. Accordingly, gas turbine engine 20 includes lubrication pump 62 that provides lubricant to geared architecture 48 during non-engine operating conditions. Lubrication pump 62 is mechanically connected to fan 42 and is driven by rotations of fan 42 in the first direction D1 to provide lubricant flow to geared architecture 48. The first direction D1 is the same direction that fan 42 rotates during operation of gas turbine engine 20

Rotations of fan 42 in a second direction D2, which is opposite the first direction D1, do not cause lubrication pump 62 to deliver lubricant. Rotation in the second direction D2 does not cause lubrication pump 62 to deliver lubricant because rotation of fan 42 in the second direction D2 runs lubrication pump 62 in a reverse direction.

Unlubricated rotations can damage fan 42 and geared architecture 48. As discussed below with reference to FIGS. 2 and 3, gas turbine engine 20 includes sprag clutch 64 that prevents rotation of fan 42 in the second direction D2.

Figure 2:
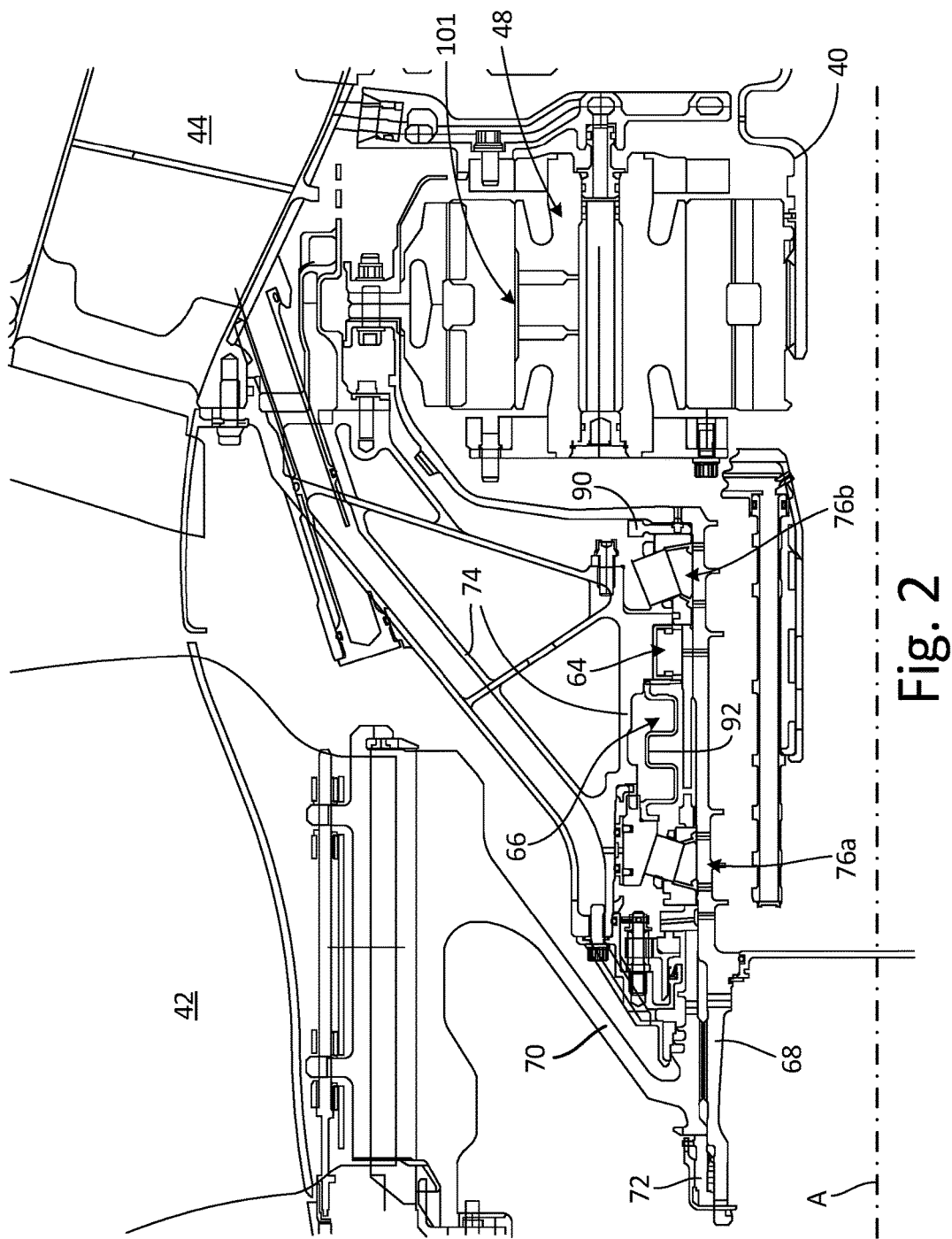
FIG. 2 is a cross-sectional view of a fan section, a front bearing compartment, and a fan drive gear box of the gas turbine engine of FIG. 1.
Figure 3:
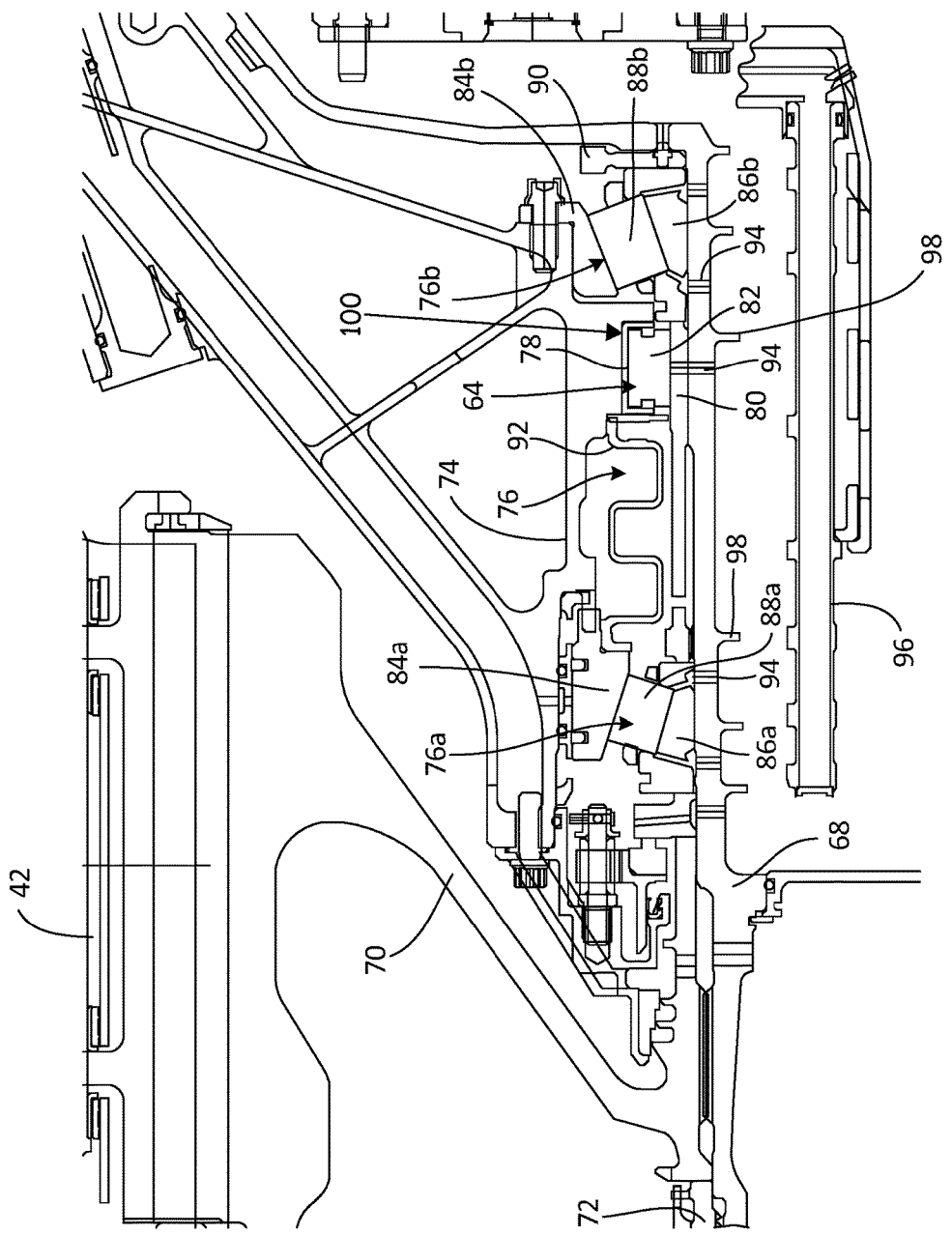
FIG. 3 is a cross-sectional view of the front bearing compartment from FIG. 2.
Figure 4:
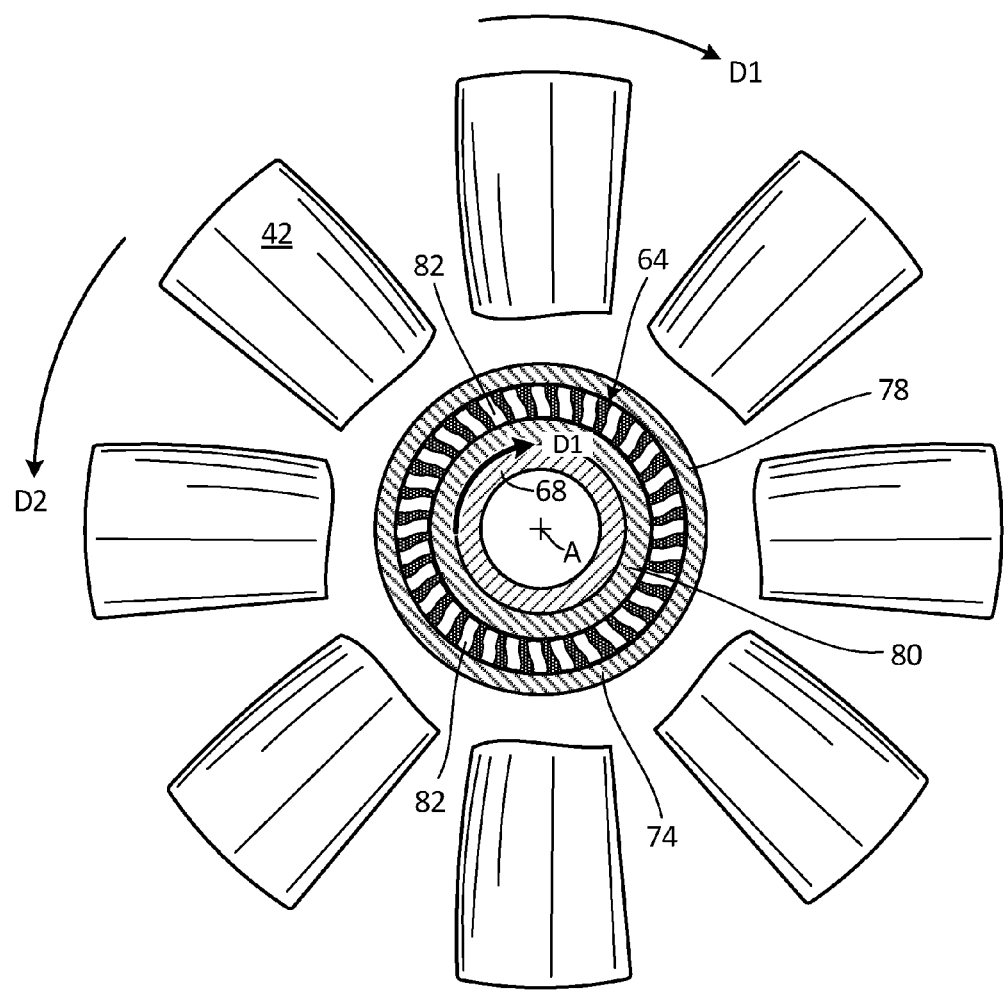
FIG. 4 is an elevation view of a fan of the gas turbine engine of FIG. 1 and a cross-sectional view of a fan drive shaft and a sprag clutch of the gas turbine engine.

FIGS. 2-4 will be discussed concurrently. FIG. 2 is a cross-sectional view of fan section 22, geared architecture 48, sprag clutch 64, and front bearing compartment 66 of gas turbine engine 20. FIG. 3 is an enlarged cross-sectional view of front bearing compartment 66 from FIG. 2. FIG. 4 is an elevation view of fan 42 and a cross-sectional view of fan drive shaft 68 and sprag clutch 64 of gas turbine engine 20. As shown in FIGS. 2-4, fan section 22 further includes front bearing compartment 66, fan drive shaft 68, fan hub 70, and fan shaft nut 72. Front bearing compartment 66 includes stationary case 74. Sprag clutch 64, first bearing assembly 76a, and second bearing assembly 76b are all disposed within front bearing compartment 66. As best shown in FIGS. 3 and 4, sprag clutch 64 includes outer race 78, sprag retainer 100, spacer 80, and a plurality of sprags 82 (only one of which is shown in FIG. 3). First bearing assembly 76a includes outer race 84a, inner race 86a, and rollers 88a (only one of which is shown in FIG. 3). Second bearing assembly 76b includes outer race 84b, inner race 86b, and rollers 88b (only one of which is shown in FIG. 3). Gas turbine 20 also includes pump gear 90, preload spring 92, lubrication ports 94, nozzle head 96, and radial dams 98.

Fan hub 70 connects fan 42 to fan drive shaft 68 such that fan 42 rotates when fan drive shaft 68 is rotated. Geared architecture 48 connects fan drive shaft 68 to inner shaft 40 of low-speed spool 30 and is configured to allow fan drive shaft 68 to rotate at a different speed than inner shaft 40. During operation of gas turbine engine 20, geared architecture 48 transfers torque from inner shaft 40 to fan drive shaft 68 to turn fan 42 in the first direction D1.

Front bearing compartment 66 is positioned axially between fan hub 70 and geared architecture 48 relative a center axis A of gas turbine engine 20. Front bearing compartment 66 is at least partially enclosed and defined by stationary case 74 that extends circumferentially around fan drive shaft 68. Stationary case 74 can be connected engine static structure 36 (shown in FIG. 1).

Both first bearing assembly 76a and second bearing assembly 76b are disposed in front bearing compartment 66. Second bearing assembly 76b is disposed aft of first bearing assembly 76a and spaced from first bearing assembly 76a. First bearing assembly 76a and second bearing assembly 76b are positioned between stationary case 74 and fan drive shaft 68 to allow rotation of fan drive shaft 68 relative stationary case 74. As shown best in FIG. 3, outer race 84a of first bearing assembly 76a and outer race 84b of second bearing assembly 76b are connected to stationary case 74. Inner race 86a of first bearing assembly 76a and inner race 86b of second bearing assembly 76b are both connected to fan drive shaft 68 and rotate about center axis A with fan drive shaft 68. Rollers 88a of first bearing assembly 76a are disposed between inner race 86a and outer race 84a. Similarly, rollers 88b of second bearing assembly 76b are disposed between inner race 86b and outer race 84b. Both first bearing assembly 76a and second bearing assembly 76b can be tapered roller bearings.

Sprag clutch 64 is disposed within front bearing compartment 66 and is disposed circumferentially around fan drive shaft 68. Stationary case 74 extends circumferentially around sprag clutch 64. As shown in FIGS. 2 and 3, sprag clutch 64 is positioned axially between first bearing assembly 76a and second bearing assembly 76b. Both first bearing assembly 76a and second bearing assembly 76b can support fan drive shaft 68 relative stationary case 74 such that radial force loads pass from fan drive shaft 68 to stationary case 74 via bearing assemblies 76a and 76b and do not pass through sprag clutch 64. The operational life of sprag clutch 64 is increased by directing radially loading through bearing assemblies 76a and 76b.

Outer race 78 (shown in FIG. 3) of sprag clutch 64 extends circumferentially around fan drive shaft 68 and is connected to stationary case 74 of front bearing compartment 66 such that outer race 78 is stationary and does not translate relative stationary case 74. Spacer 80 is disposed around fan drive shaft 68 and is disposed radially inward from outer race 78. Spacer 80 forms an inner race for sprag clutch 64. Spacer 80 also shields the more expensive fan drive shaft 68 from wear that can be caused by sprag clutch 64. Spacer 80 is connected to fan drive shaft 68 and rotates with fan drive shaft 68. To prevent rotation between spacer 80 and fan drive shaft 68, spacer 80 can include a first plurality of splines that mesh with a second plurality of splines formed on fan drive shaft 68.

As shown best in FIGS. 3 and 4, sprags 82 are disposed radially between outer race 78 and spacer 80. During rotation of fan drive shaft 68 in the first direction D1, sprags 82 slip on spacer 80 and do not inhibit the rotation of fan drive shaft 68. Should wind or air flow A (shown in FIG. 1) push against fan 42 so as to cause rotation of the fan shaft 68 in the second direction D2, sprags 82 engage spacer 80 and prohibit rotation of fan 42, fan drive shaft 68, and inner shaft 40 in the second direction D2. Pump gear 90 is disposed on fan drive shaft 68 and is positioned aft of inner race 86b of second bearing assembly 76b. Pump gear 90 mechanically connects lubrication pump 62 (shown in FIG. 1) to fan drive shaft 68. When windmilling causes fan 42 and fan drive shaft 68 to rotate in the first direction D1, pump gear 90 also rotates in the first direction D1 and actuates lubrication pump 62. In turn, lubrication pump 62 directs lubricating fluid to geared architecture 48 to lubricate the bearings and bearing surfaces of geared architecture while fan 42 windmills in the first direction D1.

Preload spring 92 extends axially between outer race 78 of sprag clutch 64 and outer race 84a of first bearing assembly 76a. Preload spring 92 pushes outer race 84a of first bearing assembly 76a forward and against tapered rollers 88a, ensuring that first bearing assembly 76a remains assembled in place within front bearing compartment 66. Fan shaft nut 72 is connected to fan drive shaft 68 and provides a stacking force against fan hub 70, inner race 86a of first bearing assembly 76a, inner race 86b of second bearing assembly 76b, spacer 80, and pump gear 90 to maintain those components in place on fan drive shaft 68.

Fan drive shaft 68 is hollow and lubrication ports 94 are formed in fan drive shaft 68, inner races 86a and 86b, and spacer 80. Lubrication ports 94 extend radially from an interior of fan drive shaft 68 into front bearing compartment 76. Nozzle head 96 can be disposed inside fan drive shaft 68 and can direct jets of lubricating fluid towards lubrication ports 94. Nozzle head 96 can be fluidically connected to lubrication pump 62 so that lubrication pump 62 can also direct lubricating oil into front bearing compartment 66 to lubricate sprag clutch 64, first bearing assembly 76a, and second bearing assembly 76b. Radial dams 98 are formed on an interior surface of fan drive shaft 68 and extend radially inward toward nozzle head 96. Each radial dam 98 is disposed proximate at least one of lubrication ports 94 and can provide a backstop that helps to direct lubricating fluid into lubrication ports 94.

In view of the foregoing description, it will be recognized that the present disclosure provides numerous advantages and benefits. For example, the present disclosure provides gas turbine engine 20 with lubrication pump 62. Lubrication pump 62 provides lubricating fluid to journal bearing surfaces 101 in geared architecture 48 when fan 42 windmills in the first direction D1. The present disclosure also provides sprag clutch 64 which prevents fan 42 from windmilling in the second direction D2. Because fan 42 is incapable of windmilling in the second direction D2, gas turbine engine 20 does not require an additional lubrication pump or a complex transmission to move lubricating fluid to geared architecture 48 in the event of windmilling in the second direction D 1. Furthermore, the present invention provides spacer 80 which prevents sprag clutch 64 from wearing and damaging fan drive shaft 68.

The following are non-exclusive descriptions of possible embodiments of the present invention.

In one embodiment, a gas turbine engine includes a fan and a first drive shaft connected to the fan. A fan drive gear box connects the first drive shaft to a second drive shaft and is configured to allow the first drive shaft to rotate at a different speed than the second drive shaft. The gas turbine engine also includes a sprag clutch disposed circumferentially around the first shaft and connected to the first drive shaft. The sprag clutch is configured to allow rotation of the first drive shaft and the fan in a first direction while prohibiting rotation of the fan and the first drive shaft in a second direction.

The gas turbine engine of the preceding paragraph can optionally include, additionally and/or alternatively, any one or more of the following features, configurations and/or additional components:

a lubrication pump mechanically connected to the first drive shaft and configured to pump lubricating fluid to the fan drive gear box when the first drive shaft is rotated in a first direction;

the lubrication pump is configured to pump the lubrication fluid to the fan drive gear box after shutdown of the gas turbine engine;

a fan hub connecting the fan to the first drive shaft; a bearing compartment positioned axially between the fan hub and the fan drive gear box, wherein the bearing compartment comprises a stationary case that extends circumferentially around the first drive shaft and around the sprag clutch;

the sprag clutch comprises an outer race that is connected to the stationary case of the bearing compartment such that the outer race does not translate relative the stationary case;

a first bearing assembly disposed in the bearing compartment between the stationary case and the first drive shaft; and wherein the sprag clutch is positioned axially aft the first bearing assembly;

a second bearing assembly disposed in the bearing compartment between the stationary case and the first drive shaft, wherein the sprag clutch is positioned axially between the first bearing assembly and the second bearing assembly;

a spacer disposed between the first drive shaft and the sprag clutch, wherein the spacer is connected to the first drive shaft and rotates with the first drive shaft;

the spacer comprises a first plurality of splines that mesh with a second plurality of splines formed on the first drive shaft; and/or the spacer forms an inner race of the sprag clutch.

In another embodiment, a gas turbine engine includes a fan and a first drive shaft connected to the fan. A fan drive gear box connects the first drive shaft to a second drive shaft and is configured to allow the first drive shaft to rotate at a different speed than the second drive shaft. A lubrication pump is mechanically connected to the first drive shaft and configured to pump lubricating fluid to the fan drive gear box when the first drive shaft is rotated in a first direction after shutdown of the gas turbine engine. A sprag clutch is connected to at least one of the first drive shaft and the second drive shaft. The sprag clutch is configured to allow rotation of the first drive shaft and the second drive shaft in the first direction while prohibiting rotation of the first drive shaft and the second drive shaft in a second direction.

The gas turbine engine of the preceding paragraph can optionally include, additionally and/or alternatively, any one or more of the following features, configurations and/or additional components:

the sprag clutch is connected to the first drive shaft and disposed around the first drive shaft;

a fan hub connecting the fan to the first drive shaft; and a bearing compartment positioned axially between the fan hub and the fan drive gear box, and wherein the sprag clutch is disposed within the bearing compartment;

a stationary outer race extending circumferentially around the first drive shaft; an inner race disposed radially inward from the stationary outer race; and a plurality of sprags disposed between the stationary outer race and the inner race;

the inner race is connected to the first drive shaft and is configured to rotate with the first drive shaft;

a first bearing assembly disposed in the bearing compartment; and wherein the sprag clutch is positioned axially aft the first bearing assembly;

a second bearing assembly disposed in the bearing compartment and disposed aft of the first bearing assembly, wherein the sprag clutch is positioned axially between the first bearing assembly and the second bearing assembly;

a preload spring extending axially between the stationary outer race of the sprag clutch and an outer race of the first bearing assembly; and/or the lubrication pump is configured to pump the lubrication fluid to the fan drive gear box after shutdown of the gas turbine engine.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprises:
a fan;
a first drive shaft connected to the fan;
a fan drive gear box connecting the first drive shaft to a second drive shaft and configured to allow the first drive shaft to rotate at a different speed than the second drive shaft;
a sprag clutch disposed circumferentially around the first drive shaft and connected to the first drive shaft, wherein the sprag clutch is configured to allow rotation of the first drive shaft and the fan in a first direction while prohibiting rotation of the fan and the first drive shaft in a second direction.

2. The gas turbine engine of claim 1, wherein the gas turbine engine further comprises:
a lubrication pump mechanically connected to the first drive shaft and configured to pump lubricating fluid to the fan drive gear box when the first drive shaft is rotated in a first direction.

3. The gas turbine engine of claim 2, wherein the lubrication pump is configured to pump the lubrication fluid to the fan drive gear box after shutdown of the gas turbine engine.

4. The gas turbine engine of claim 2, wherein the gas turbine engine further comprises:
a fan hub connecting the fan to the first drive shaft;
a bearing compartment positioned axially between the fan hub and the fan drive gear box, wherein the bearing compartment comprises a stationary case that extends circumferentially around the first drive shaft and around the sprag clutch.

5. The gas turbine engine of claim 4, wherein the sprag clutch comprises an outer race that is connected to the stationary case of the bearing compartment such that the outer race does not translate relative the stationary case.

6. The gas turbine engine of claim 5, wherein the gas turbine engine further comprises:
a first bearing assembly disposed in the bearing compartment between the stationary case and the first drive shaft; and
wherein the sprag clutch is positioned axially aft the first bearing assembly.

7. The gas turbine engine of claim 6, wherein the gas turbine engine further comprises:
a second bearing assembly disposed in the bearing compartment between the stationary case and the first drive shaft,
wherein the sprag clutch is positioned axially between the first bearing assembly and the second bearing assembly.

8. The gas turbine engine of claim 6, wherein the gas turbine engine further comprises:
a spacer disposed between the first drive shaft and the sprag clutch,
wherein the spacer is connected to the first drive shaft and rotates with the first drive shaft.

9. The gas turbine engine of claim 8, wherein the spacer comprises a first plurality of splines that mesh with a second plurality of splines formed on the first drive shaft.

10. The gas turbine engine of claim 9, wherein the spacer forms an inner race of the sprag clutch.

11. A gas turbine engine comprises:
a fan;
a first drive shaft connected to the fan;
a fan drive gear box connecting the first drive shaft to a second drive shaft and configured to allow the first drive shaft to rotate at a different speed than the second drive shaft;
a lubrication pump mechanically connected to the first drive shaft and configured to pump lubricating fluid to the fan drive gear box when the first drive shaft is rotated in a first direction; and
a sprag clutch connected to at least one of the first drive shaft and the second drive shaft and configured to allow rotation of the first drive shaft and the second drive shaft in the first direction while prohibiting rotation of the first drive shaft and the second drive shaft in a second direction.

12. The gas turbine engine of claim 11, wherein the sprag clutch is connected to the first drive shaft and disposed around the first drive shaft.

13. The gas turbine engine of claim 12, wherein the gas turbine engine further comprises:
   a fan hub connecting the fan to the first drive shaft; and
   a bearing compartment positioned axially between the fan hub and the fan drive gear box, and
   wherein the sprag clutch is disposed within the bearing compartment.

14. The gas turbine engine of claim 13, wherein the sprag clutch further comprises:
   a stationary outer race extending circumferentially around the first drive shaft;
   an inner race disposed radially inward from the stationary outer race; and
   a plurality of sprags disposed between the stationary outer race and the inner race.

15. The gas turbine engine of claim 14, wherein the inner race is connected to the first drive shaft and is configured to rotate with the first drive shaft.

16. The gas turbine engine of claim 15, wherein the gas turbine engine further comprises:
   a first bearing assembly disposed in the bearing compartment; and
   wherein the sprag clutch is positioned axially aft the first bearing assembly.

17. The gas turbine engine of claim 16, wherein the gas turbine engine further comprises:
   a second bearing assembly disposed in the bearing compartment and disposed aft of the first bearing assembly,
   wherein the sprag clutch is positioned axially between the first bearing assembly and the second bearing assembly.

18. The gas turbine engine of claim 16, wherein the gas turbine engine further comprises:
   a preload spring extending axially between the stationary outer race of the sprag clutch and an outer race of the first bearing assembly.

19. The gas turbine engine of claim 11, wherein the lubrication pump is configured to pump the lubrication fluid to the fan drive gear box after shutdown of the gas turbine engine.

\* \* \* \* \*